Oct. 10, 1933.  J. M. HARGRAVE  1,930,343
CLAMP TIGHTENING MACHINE
Filed Aug. 13, 1929   4 Sheets-Sheet 1

INVENTOR
John M. Hargrave
BY
Wood & Wood
ATTORNEYS

Oct. 10, 1933.    J. M. HARGRAVE    1,930,343
CLAMP TIGHTENING MACHINE
Filed Aug. 13, 1929    4 Sheets-Sheet 2
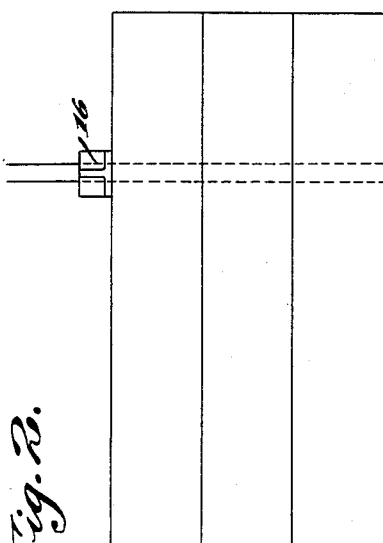
Fig. 2.
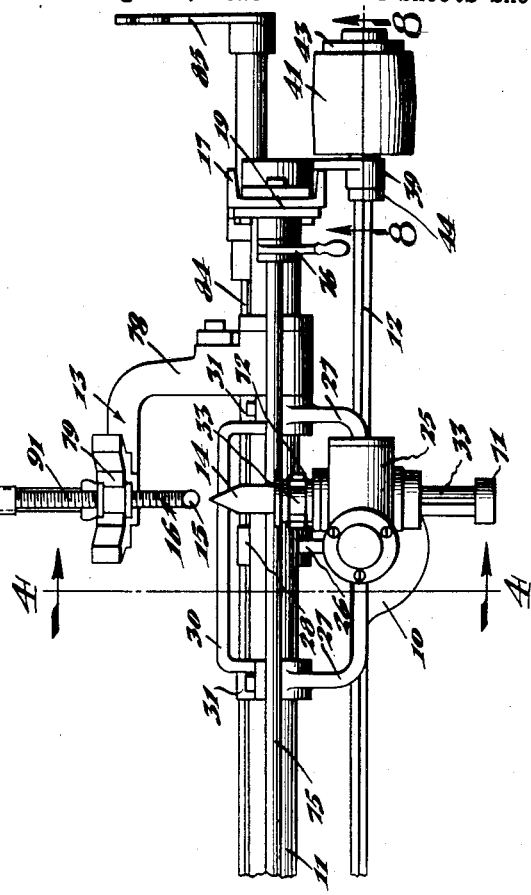
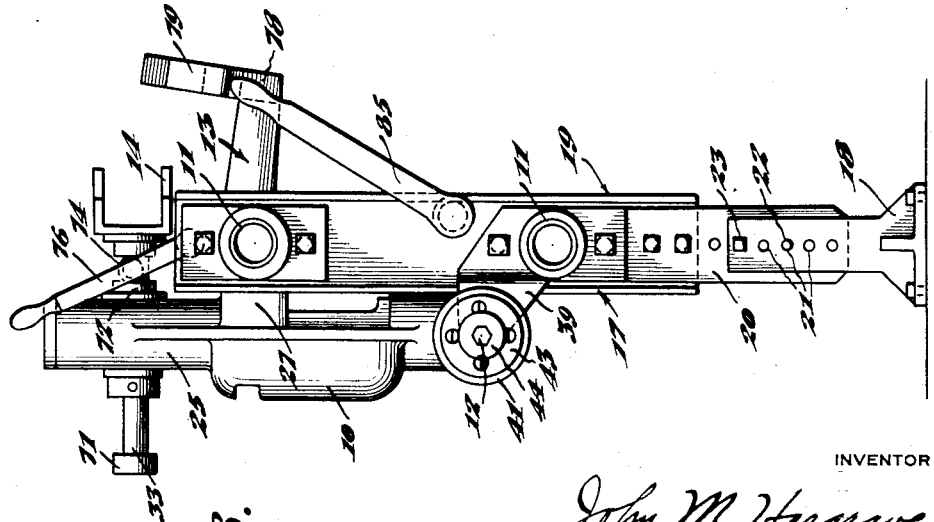
Fig. 3.
INVENTOR
John M. Hargrave
BY
Wood & Wood ATTORNEYS Oct. 10, 1933.   J. M. HARGRAVE   1,930,343
CLAMP TIGHTENING MACHINE
Filed Aug. 13, 1929   4 Sheets-Sheet 3

INVENTOR
John M. Hargrave
BY
Wood & Wood ATTORNEYS

Oct. 10, 1933.      J. M. HARGRAVE      1,930,343
CLAMP TIGHTENING MACHINE
Filed Aug. 13, 1929      4 Sheets-Sheet 4
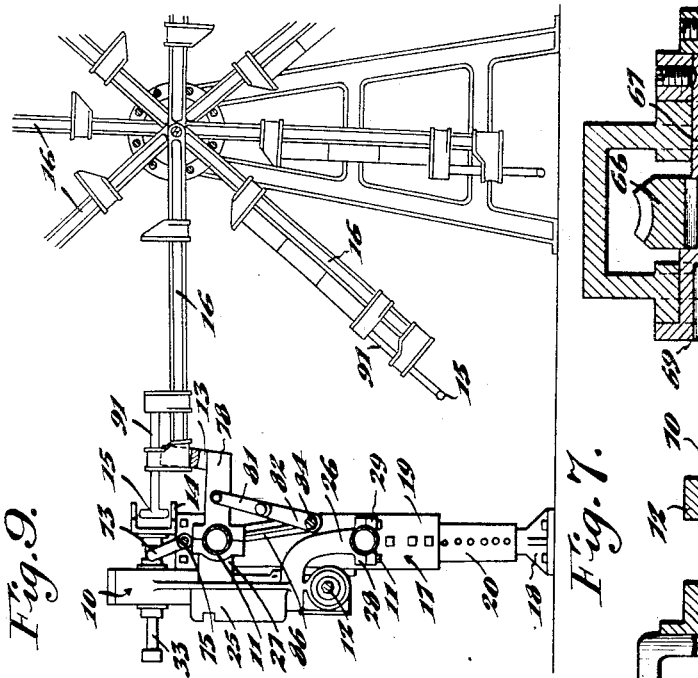
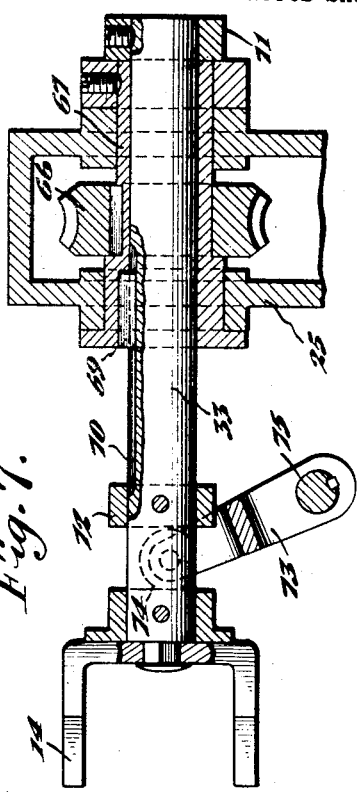
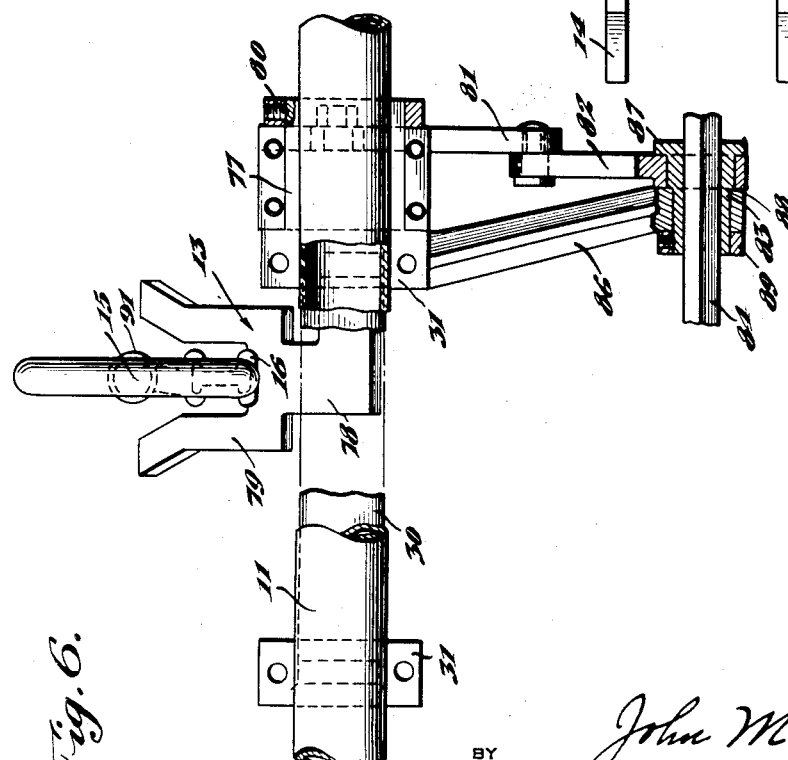
INVENTOR
John M. Hargrave
BY
Wood & Wood      ATTORNEYS Patented Oct. 10, 1933

1,930,343

UNITED STATES PATENT OFFICE 1,930,343

CLAMP TIGHTENING MACHINE

John M. Hargrave, Cincinnati, Ohio

Application August 13, 1929. Serial No. 385,672

6 Claims. (Cl. 81—56)

This invention relates to clamping apparatus, and is particularly directed to a clamp tightening machine useful as an accessory or attachment for a gang clamping machine. The machine to which the present invention is applied usually includes a series of clamping frames coming up successively and swinging into a loading position, each frame having a plurality of clamps incorporated therein arranged whereby a series of boards may be clamped together during gluing, as is customary in forming a table top.

This clamping machine while extremely effective in handling large quantities of work, is inefficient in that the clamps for a particular machine, or the clamps of the respective frames, are drawn up manually and it is, therefore, impossible to tighten them equally. It is important that the pressure applied to the work be equal along the entire edges thereof, but due to the operator's inability to manually gauge the pressure applied to each clamp, the result is that various degrees of pressure are applied to the work. The quality of the work produced, therefore, depends entirely on the particular operator, and the pressures applied vary according to strength or care exercised.

It is an object of this invention to provide, as an adjunct to a machine of this class, an automatically controlled clamp tightening machine, which imparts a uniform pressure to all the clamps which it tightens. This machine preferably is power driven. It is also intended that the present machine may be used for loosening the clamps.

It is another object to provide a clamp tightening machine in which a plurality of units are included, one for each clamp, these units adjustable relative to each other to fit the varied spacing of clamps of a frame which are brought up to the same.

Another object is to provide an attachment of this nature, which, in addition to its clamp tightening function, also provides a support for the particular clamp frame which is being worked upon.

Other objects relate to the means for displacing the support when it is desired to progress the clamping frames; to the control for simultaneously engaging the tightening drive to the respective clamps of a frame; and also to the arrangement of the accessory machine, whereby the same may be easily displaced from its operative position relative to the clamping machine.

Further objects and advantages will be more fully set forth in the description of the accompanying drawings, in which:

Figure 2 is a top plan view of one end of the machine illustrating a tightening unit of the machine in position relative to one of the clamps of a gang clamping machine.

Figure 3 is an end view of the machine.

Figure 6 is a fragmentary sectional view taken on line 6—6, Figure 4, a portion of the view being broken away for illustrating the parts of a unit.

Figure 7 is a sectional view taken on line 7—7, Figure 5, illustrating the shifting mechanism for moving the tightening yoke toward and from the clamp.

Figure 8 is a fragmentary sectional view taken on line 8—8, Figure 2, detailing the mounting of the driving pulley on the drive shaft.

Figure 9 is an end view of the machine diagrammatically showing the same relative to the gang clamping machine.

Figure 1:
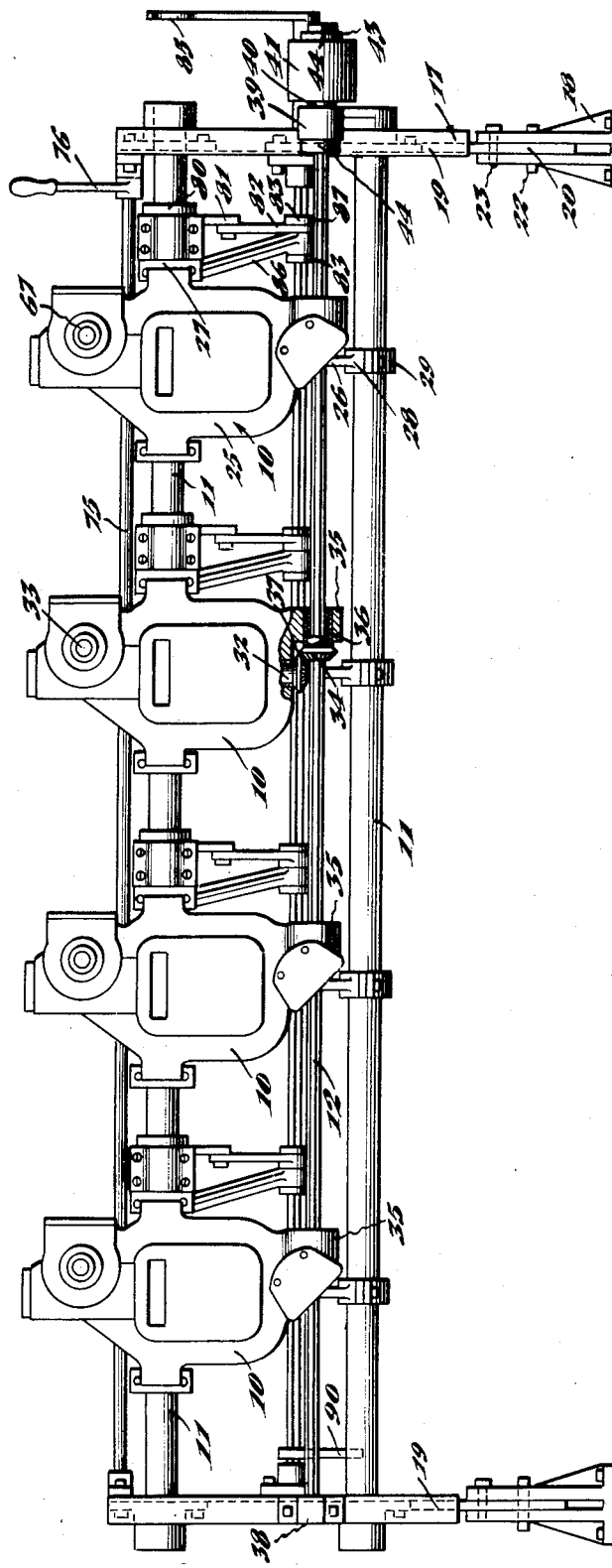
Figure 1 is a front view of the clamp tightening machine.
Figure 5:
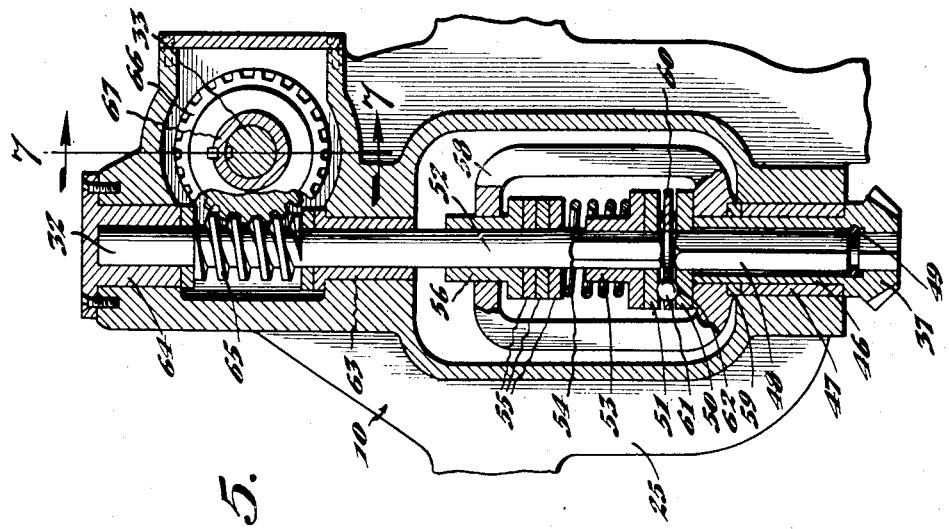
Figure 5 is a sectional view taken on line 5—5, Figure 4, illustrating the power transmission within the tightening unit.

The machine described in general comprises a plurality of units 10 slidably mounted on tubular rails 11 and a drive shaft 12 traversing all the units, each unit providing an extending rest 13 for supporting the adjacent clamp 16 of the particular frame and each incorporating a transmission from the drive shaft 12 to a coupling element 14, the coupling element of each unit simultaneously and selectively engageable with the handle 15 of the clamp 16.

The transmission in each unit includes a slip device whereby a uniform tightening force is imparted to each clamp and the power thereafter automatically disconnected. The rests 13 are capable of being swung out of the path of movement of the clamping frames of the clamping machine to which the present invention is annexed, and the entire clamp tightening machine is capable of being thrown back from the clamping machine.

Referring to the drawings, the frame 17 of the machine comprises a pair of slotted feet 18—18, and end frames 19—19 formed of outwardly facing channel irons secured upright to each foot 18 by means of a bar of metal 20. Each bar of metal 20 is permanently secured to the channel iron and has a vertically disposed row of apertures 21, any one of which is alignable with the particular apertures of the foot when the bar is inserted in the slot thereof.

A pin 22 traverses aligned apertures of each foot and bar forming a pivot point for the machine, and a bolt 23 is screwed through other aligned apertures thereabove for setting the machine in vertical position. The end frames 19—19 of the machine are joined by the tubes or rails 11—11, these tubes being affixed relative to the end frames and forming supports for the sliding units 10, and the upper thereof also forming a pivot for the clamp supports. It will be readily understood that any number of units may be used and mounted on the tubes or longitudinal rails of the machine, the description therefore being directed only to one unit.

Each unit has an irregular casing 25, the various portions of which will be described as the purpose thereof is disclosed. The casing or frame 25 has three arms, one 26 thereof attached to the lower tube and the other two 27—27 spaced along the upper tube and attached thereto. The attachment of the lower arm to the tubes is by means of a split bearing, one half 28 of the bearing being integral with the arm and the other half 29 bolted thereto for clamping the arm to the tube. In the instance of the upper pair of arms, a yoke-shaped bearing element 30 spans the space between the arms and provides an attaching bearing portion 31 at each end bolted to the adjacent arm for clamping the unit to the upper tube or rail. When it is necessary to vary the spacing of the units due to varied clamp spacing, the bearings 29, 30, are loosened and the unit slid along the rails.

A two piece shaft 32 is journalled vertically in the frame and is in driving connection with the drive shaft 12 and with a clamping shaft 33 at the top of the frame. A bevel gear 34 is mounted on the drive shaft against and within a downwardly extending boss 35 of the frame, this boss loosely traversed by a hub extension 36 of the gear. The drive shaft is hexagonal and the gear has a hexagonal bore extending therethrough for a rotative driving connection. Another bevel gear 37 is mounted on the lower end of the vertical shaft, being in mesh with the first mentioned beveled gear and holding it against the boss of the frame.

The hexagonal driving shaft 12, traversing all the units, is journalled for rotation in bearing brackets 38, 39, secured to the respective channel iron end frames 17. The drive shaft at the driven end thereof loosely traverses a sleeve 40, this sleeve being secured against rotation in the bearing 39 at the end of the machine.

A pulley 41 is mounted on the extending end of the sleeve, and a washer 43 having a hexagonal bore is attached to the outer face of the pulley and abuts the bearing. The driving connection of the pulley to the shaft 12 is, therefore, through the washer 43. Collars 44—44 are secured on the hexagonal drive shaft, one abutting the inner end of the sleeve and the other abutting the washer 43 for preventing longitudinal displacement of the driving shaft relative to the sleeve.

The vertically disposed beveled gear 37 has a sleeve portion 46 extending through a bushing 47 of the main frame of the unit and is in driving connection with the lower section 48 of the transmission shaft 32 through the hexagonal end of the section 48 entered into a hexagonal bore of the gear. Longitudinal displacement of the gear from the shaft is prevented by means of a circular spring clip 49 seated in an annular portion of the shaft and outwardly sprung into an adjacent circular groove in the inner bore of the gear sleeve.

Figure 4:
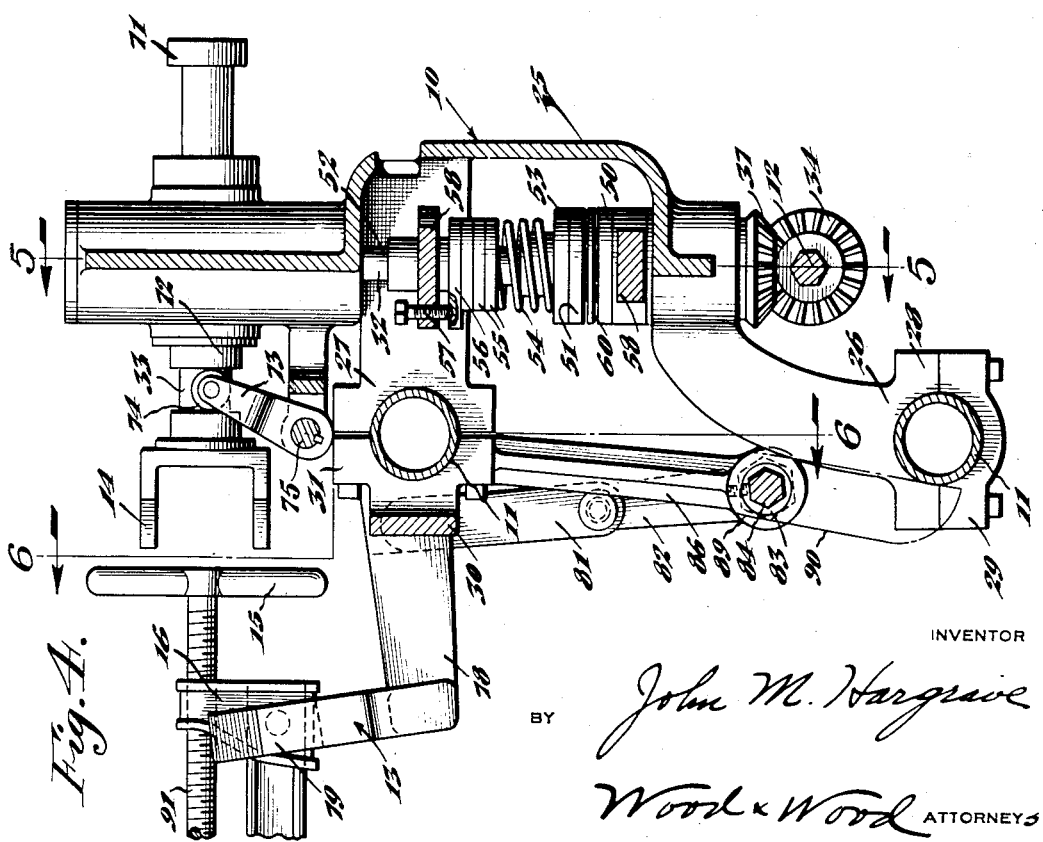
Figure 4 is a sectional view taken on line 4—4, Figure 2, detailing the construction of one of the clamp tightening units.

The upper end of the hexagonal lower shaft section is in rotative connection with a washer 50 of the slip device, this washer opposing another washer 51 secured to the lower hexagonal end of the upper shaft section 52. The upper washer engages against a spring seat 53, and a spring 54 is compressed between the spring seat and a series of washers 55 loosely disposed about the shaft and engaging against a flanged sleeve 56 also loose on the shaft. The flanged sleeve is set in position longitudinally of the shaft by means of a screw 57 (see Figure 4) adjustably set against the upper surface of the flange thereof, the screw being mounted in the web of a lateral thrust receiving yoke-shaped bearing 58 journalled about the flanged sleeve and also about the upper end of the sleeve hub of the gear. The yoke-shaped bearing 58 is rotatable on a washer 59, resting on the end of the bushing 47.

Between the opposing washers 50, 51, a floating washer or ball retainer 60 is provided, this washer having a series of balls 61 located in apertures formed therein, the balls rolling against and between the respective surfaces of the upper and lower washers. Corresponding depressions 62 are formed in the surfaces of the washers for receiving the balls and temporarily causing the washers to rotate as a unit. However, as soon as the driving force coming through the gearing and imparted to the lower washer becomes strong enough to compress the spring 54 and displace the balls 61 from the depressions or seats 62, the connection to the upper shaft will be broken.

The upper shaft toward its upper end is journalled in bushings 63, 64, secured within the casing and provides an integral worm 65 between its respective bearing bushings, this worm being in mesh with a spiral gear 66 and the spiral gear keyed to a sleeve 67 journalled in the walls of the casing at right angles to the vertical shaft or horizontally. This sleeve 67 is in splined connection with the shaft 33, traversing the same, by means of a key 69 and a long keyway 70. The coupling element 14 provides jaws or fingers straddling the right angle handle portion 15 of the clamp and rotatively engaging therewith and is pinned to the extreme outer end of the last mentioned shaft, the fingers extending axially from the end of the shaft. Outward movement of the shaft 33 is limited by a collar 71 attached to the extreme end of the shaft opposite to that end carrying the coupling element.

A collar 72 is pinned to the shaft inwardly spaced from the end, and an arm 73, having a yoke end straddling the shaft and rollers 74 on its respective arms disposed between the collar and the clamp handle clutch fingers, is keyed to a longitudinally disposed rock shaft 75. The rock shaft 75 extends the length of the machine and is journalled in the end frames thereof. This shaft has an arm 73 for each unit keyed thereto, the shaft being rocked by means of a hand lever 76 at one end thereof for simultaneously sliding the shafts 33 back and forth in each unit and relative to the clamps.

The rests 13 are pivotally mounted on the upper tubular rail for the purpose of permitting the downward displacement of the rests from their operative positions relative to the clamps. The bearing element 30 and arm 27 are provided with semi-circular extensions 77 in joined position forming an extending sleeve about the tubular rail. The rests 13 are loosely mounted on this sleeve extension 77, a split bearing portion being provided for the rest. An arm 78 extends integral with the inner half of the split bearing and is formed upwardly and bifurcated to provide a U-shaped rest 79 between the arms of which the body of the clamp is supported. A collar 80 is attached to the extending outer end of the sleeve portion 77 by means of a set screw for maintaining the arm against longitudinal displacement.

A means is provided for swinging the rest and locking the same in position of support, comprising toggle links 81, 82, the upper link 81 being attached to the arm 78 intermediate the rest portion and the bearing or pivot portion, and the lower link 82 being secured for rotation with a sleeve 83 slidably mounted on a hexagonal rock shaft 84 and rotatable therewith. A lever 85 is provided on the end of the rock shaft 84, this shaft 84 traversing a sleeve 83 for each unit for simultaneous operation of the toggle.

For stabilizing the connection of the toggle to the rock shaft and maintaining it relative to the rests against longitudinal displacement on the rock shaft, an arm 86 extends down from the bearing element 30, the sleeve 83 loosely traversing this arm. The sleeve is headed at one end, the head 87 abutting the outer face of the toggle, and has an offset or shoulder 88 abutting the side of the arm 86, providing a loose bearing portion for the toggle. A collar 89 is attached to the opposite end of the sleeve 83 on the other side of the arm 86 for preventing displacement of the sleeve relative to the arm. A swinging stop 90 is attached to the hexagonal rock shaft 84, this stop adapted to engage the lower tubular rail when the toggle is aligned and in locked position, this alignment occurring when the rests are set in operative position.

As shown in Figure 9, the clamp frames are rotatively brought up to the device of the present invention and are disposed in a horizontal plane by disposition of the clamps in the respective rests of the unit, thus placing the screws 91 of the clamps in axial alignment with the clamp tightening shafts 33. The lever 76 is operated to move the shafts carrying the fingers into rotative connection with the handle of the clamp, and the screws are rotated by power until the desired pressure is applied, this being governed by varying the tension of the springs 54.

When the desired pressure has been applied, the slip devices in each unit will operate to cut off the power to the clamp handles and the power will idle. The operator then moves the clutch fingers back and away from the handles and lowers the rests through the toggles, permitting the swinging frame to pass, resets the rests, and deposits the next frame in position thereon.

Having described my invention, I claim:

1. A device for tightening the clamps of a clamping machine, comprising, coupling fingers, means for disposing said fingers in rotative connection with the clamp handles, transmissions extending from said fingers to a common source of rotation, a slip device in each of said transmissions for automatically disconnecting the power as a predetermined pressure is imparted to the respective clamps, a support for each clamp, and common means for displacing said supports when the clamps have been tightened.

2. A device for use with a gang clamping machine, comprising, progressively advancing frames having a plurality of clamps therein, comprising tightening devices, each including a body, a coupling finger mounted on said body and engageable with the handle of a respective clamp, a transmission to said coupling finger, a slip device in said transmission, a common source of rotation for all of said tightening devices, a clamp support pivotally mounted on each frame, a control shaft, toggles connected between each support and said control shaft, and means for rocking said control shaft to alternately displace said supports from operative positions, with the toggles aligned, to a displaced position.

3. A device for use with a gang clamping machine of the type including progressively advancing frames swinging about a center and each frame having a plurality of clamps therein, comprising, a frame mounted adjacent the arc of travel of the handles of said clamps, independently driven coupling fingers rotatively mounted in said frame, means for shifting the fingers into engagement with the clamp handles, supports mounted on the frame for supporting the clamping machine frame while the clamps are being tightened, means for moving the supports into and out of position in the path of travel of the respective clamp frames, and means for driving said clamp tightening fingers.

4. A machine for use with a gang clamping machine, including progressively advancing frames having a plurality of clamps therein; comprising, a plurality of tightening devices, including frames, coupling fingers engageable with the handles of the respective clamps, driving transmissions for said coupling fingers, slip devices in said transmissions, clamp supports pivotally mounted on the respective frames, means for driving said transmissions and a common means for displacing said supports from operative positions.

5. A machine adapted to be used with a gang clamping machine including progressively advancing frames having a plurality of clamps therein; comprising, tightening devices, a support frame for said tightening devices, said support frame including a rail slidably supporting the tightening devices, means for adjustably securing said tightening devices on the rail in the desired positions relative to the clamps of the clamping machine, coupling fingers mounted within the respective tightening devices and engageable with the handles of the respective clamps, driving transmissions for said coupling fingers, slip devices in said transmissions, clamp supports mounted on the respective tightening devices and means for displacing said supports from operative positions.

6. A device for tightening a joiner's clamp, comprising, a frame, a coupling element engageable with the handle of said clamp, a driving transmission for said coupling element, a slip device in said transmission, a clamp support for disposing the clamp relative to the coupling element, means for driving said transmission, and means for moving said support from operative position to inoperative position.

JOHN M. HARGRAVE.